(12) United States Patent
Blot

(10) Patent No.: US 9,114,868 B2
(45) Date of Patent: Aug. 25, 2015

(54) METHOD OF MANUFACTURING A STRUCTURE COMPRISING A SKIN AND STIFFENERS

(75) Inventor: Philippe Blot, Nantes (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 13/605,884

(22) Filed: Sep. 6, 2012

(65) Prior Publication Data

US 2013/0108837 A1 May 2, 2013

(30) Foreign Application Priority Data

Sep. 7, 2011 (FR) ...................................... 11 57928

(51) Int. Cl.

| | |
|---|---|
| *B29C 70/30* | (2006.01) |
| *B64C 1/12* | (2006.01) |
| *B29C 70/34* | (2006.01) |
| *B29D 99/00* | (2010.01) |
| *B29C 70/20* | (2006.01) |
| *B64F 5/00* | (2006.01) |
| *B29C 33/14* | (2006.01) |
| *B29K 707/04* | (2006.01) |
| *B29C 33/76* | (2006.01) |
| *B29L 31/30* | (2006.01) |
| *B64C 1/00* | (2006.01) |

(52) U.S. Cl.

CPC . *B64C 1/12* (2013.01); *B29C 33/14* (2013.01); *B29C 70/205* (2013.01); *B29C 70/342* (2013.01); *B29D 99/0014* (2013.01); *B64F 5/0009* (2013.01); *B29C 33/76* (2013.01); *B29K 2707/04* (2013.01); *B29L 2031/3082* (2013.01); *B64C 2001/0072* (2013.01); *Y02T 50/433* (2013.01); *Y10T 428/24744* (2015.01)

(58) Field of Classification Search

CPC ...................................................... B29C 70/342
USPC .................................................... 264/257, 258
See application file for complete search history.

(56) References Cited

U.S. PATENT DOCUMENTS

| | | | |
|---|---|---|---|
| 6,290,799 B1 * | 9/2001 | Deckers et al. | ............... 156/264 |
| 7,479,201 B1 | 1/2009 | Wegner | |
| 2006/0125155 A1 * | 6/2006 | Sekido et al. | ................ 264/511 |

(Continued)

FOREIGN PATENT DOCUMENTS

| | | |
|---|---|---|
| EP | 2 317 126 | 5/2011 |
| FR | 2 953 754 | 6/2011 |

(Continued)

OTHER PUBLICATIONS

French Search Report dated Apr. 20, 2012.

*Primary Examiner* — Christina Johnson
*Assistant Examiner* — Patrick Butler
(74) *Attorney, Agent, or Firm* — Dickinson Wright PLLC

(57) ABSTRACT

A method of manufacturing a structure, in particular an aircraft fuselage of composite materials comprising a skin (2) and V-section members fastened to the skin (2) referred to as stiffeners (4). The method comprises a step of positioning punches on a mandrel in order to form channels between the punches. The channels are disposed in at least two networks (6a, 6b, 6c), each channel of the same network (6a, 6b, 6c) meeting at least one channel of another network at a node (8). The method also comprises a step of positioning preforms for stiffeners in the channels such that at least two stiffeners (4) meet at said node (8) and a step of injecting resin so as to assemble the stiffeners (4). A structure made as a single piece is thereby obtained.

8 Claims, 3 Drawing Sheets

(56) References Cited

U.S. PATENT DOCUMENTS

2008/0224360 A1  9/2008  Ashton
2012/0023727 A1  2/2012  Meyer

FOREIGN PATENT DOCUMENTS

| GB | 576422 | 4/1946 |
|----|--------|--------|
| WO | 2004/011169 | 2/2004 |

* cited by examiner

METHOD OF MANUFACTURING A STRUCTURE COMPRISING A SKIN AND STIFFENERS

The invention relates to a method of manufacturing a structure comprising a skin and stiffeners, in particular an aircraft fuselage of composite materials, and an associated device.

In the usual way, when an aircraft fuselage is produced from composite materials, it is constituted by panels having longitudinal stiffeners of T-, L-, Z- or Omega-shaped cross-section (called stringers).

In order to consolidate the structure, the fuselage frames are mounted perpendicularly to the stiffeners and fastened to the panels using components commonly called clips. As a matter of fact, in most of these cases, the frame is not in direct contact with the skin.

Components called cleats are furthermore used to connect the frames to the stiffeners, in particular to prevent the frames from bending, by torsional buckling, when subjected to mechanical forces.

The assembly of the frames, clips, and cleats onto the already constituted panel of the skin and of the stiffeners is a costly operation on account of its length and the fitting it requires.

An aircraft structure composed of a skin reinforced with a network of stiffeners oriented at 60° to each other, the stiffeners being in the form of strips and being integrated into the panel, is already known by the name "Isogrid" structure. However, this structure is usually only implemented for an isotropic material and not for composites materials. The invention aims to mitigate at least one of the aforementioned drawbacks.

The invention thus concerns a method for manufacturing a structure comprising a skin and stiffeners fastened to the skin, comprising the following steps:
  positioning molding parts on a mandrel in order to form channels between said parts, said channels being disposed in at least two networks, a channel of a network meeting at least one channel of another network at a point referred to as a node;
  positioning preforms for stiffeners in the channels such that two stiffeners at least meet at said node;
  injecting resin so as to assemble said two stiffeners.

As the channels advantageously reproduce the desired disposition for the stiffeners, such an arrangement of the stiffeners in networks, for example in the circumferential direction and parallel to each other, makes it possible to dispense with the use of frames, clips and cleats since it enables a structure of equivalent strength to be obtained.

The method as defined thus makes it possible to obtain a strong structure made as a single part, which enables time to be saved during manufacture and to minimize the associated costs relative to a conventional structure.

Thanks to the method of the invention, it is no longer necessary to perform the costly and painstaking operations constituted by the fastening and fitting of clips and cleats.

To be precise, the only operations required during this method are the operations of positioning the stiffeners and injecting resin connecting them together, which are greatly facilitated by the presence of the channels on the mandrel.

According to a possible feature of the invention, the surface delimited by the longitudinal extent of a channel of at least one network is not normal to the axis of the mandrel.

In other words, the network is disposed obliquely relative to the circumferences of the mandrel, in other words of the fuselage (used in a conventional structure of frames) for that particular application. Certain stiffeners may be circumferential (that is to say perpendicular to the axis of the fuselage), others parallel to the axis of the fuselage.

A possible configuration comprises two networks of stiffeners, none of the surfaces delimited by the stiffeners being normal to the fuselage axis. For example, the angle formed by two stiffeners belonging to different networks is equal to 45°. Other angles may of course be envisioned.

Another possible configuration comprises two networks of stiffeners, the surfaces delimited by the stiffeners of the first network being normal to the axis of the fuselage (circumferentially, in equivalent manner to that of a usual network of frames) and the surfaces delimited by the stiffeners of the second network not being so. The angle between two stiffeners of the two different networks is for example equal to 30° but may be different. A greater number of networks may also be envisioned.

In particular, in order to obtain a stronger structure, the stiffeners may be disposed in at least three networks, each node being a point of intersection between at least three stiffeners of at least three different networks.

Thus, a possible configuration comprises three networks, the surfaces delimited by the stiffeners of one of the networks being normal to the axis of the fuselage (in equivalent manner to that of a conventional network of frames, that is to say circumferentially), the other two being disposed obliquely relative thereto.

Preferably, the disposition of the networks of stiffeners is geodesic.

The geodesic structure provides the networks of stiffeners with a geometric disposition that is easy to produce, and optimal from the point of view of load distribution.

Before injecting resin, the components such as the skin or the stiffeners are preferably in the form of textile preforms.

These are structures constituted by dry fibers and manufactured from unidirectional fabrics or multiaxials, or manufactured directly for example by braiding.

To provide cohesion to these textile preforms, the dry fibers are preferably connected together, either by a small quantity of epoxy powder (for example 2 to 5% by mass), or by sewing, or by application of a thermoplastic web.

In particular, the stiffeners are constituted by a covering and reinforcements.

Thus, the method may further comprise a step of positioning a covering preform for stiffeners in the channels and a step of positioning reinforcements for stiffeners on said coverings.

These two steps preferably take place one after the other, during the step of positioning the stiffeners, that is to say prior to the step of injecting resin.

The reinforcements mainly serve to bear the forces of tension-compression, and even of bending. The role of the covering is in particular to provide the connection with the skin and to provide protection to the stiffener reinforcements.

According to a possible feature of the invention, the manufacturing method further comprises a step of skin preform draping.

This step is preferably the last step before the resin injection.

According to a possible feature of the invention, the stiffeners have a V-shaped cross-section.

A V-shaped cross-section enables easy removal of the molded parts used in the step of injecting resin which takes place on manufacturing the stiffeners. However, other cross-sections may be envisioned such as the conventional T- or Omega-shaped cross-sections.

In order to consolidate the structure, the reinforcements for the stiffeners are composed of unidirectional yarns or rovings and the covering for the stiffeners is composed of fabrics or multiaxials.

The reinforcements mainly serve to bear the forces of tension-compression, and even of bending. They are constituted for example from dry unidirectional yarns (UD) or rovings of composite fibers such as carbon fibers and from the working covering which may be constituted by reinforcing fabrics or multiaxials. Preferably, the fibers are oriented at 0° i.e. along the longitudinal of the stiffener.

These unidirectional reinforcements are preferably continuous.

The covering is preferably composed of fabrics or multiaxials, thus making it possible to provide the connection with the skin and to give protection to the unidirectional fibers of the stiffeners.

For example, each covering is constituted by multilayer composite fiber plies the layers of which are disposed at 0°, 90°, 45° and −45°.

This is strong configuration with regard to the forces that come into play.

Alternatively, each covering is constituted by multilayer composite fiber plies the layers of which are disposed at 0°, 90°, 30° and −30°.

In order to obtain a structure made as a single part, the skin preform is draped over the stiffener preforms.

According to a possible feature, the method according to the invention also comprises a step of positioning a substantially circular piece of fabric holed at its center at the location of the node (called hat) providing a mechanical connection between the stiffeners meeting at each node.

The purpose of the hats is in particular to connect the stiffeners together and thereby distribute part of the sheer forces. For this they cover all the ends of the stiffeners at the location of each node.

The circular shaped provided with a hole facilitates the draping and gives better load distribution.

To that end, the hats are for example constituted by a reinforcing fabric of composite material, or a multiaxial.

In order to ensure a strong connection between the stiffeners and the skin, the resin is injected into the stiffener preforms between the molding parts, and between the skin preform and the punches. This co-impregnation with resin also enables residual loads to be taken up.

So as to obtain good quality impregnation of the preforms by the resin, the injection of the stiffeners and the injection of the skin may be carried out separately.

In particular, the injection of the stiffeners may be a linear injection into the channels between the punches, and is carried out over practically the full length of the stiffeners. As regards the injection of the skin, this may be either localized at the center of the punches under the skin, or, to have good quality impregnation of the skin, be surface injection over the entire surface of the punches at the punch-skin interface. Preferably, the resin is injected then polymerized.

According to a particular feature, the injection is carried out by a bag molding method in an autoclave using a diffuser mesh.

The invention also concerns a device for manufacturing a structure comprising a skin and stiffeners fastened to the skin, comprising:

a mandrel;
punches fastened to the mandrel so as to form channels between said punches, said channels being disposed in at least two networks, a channel of a network meeting at least one channel of another network at a point referred to as a node;
a system for positioning stiffeners in the channels such that two stiffeners at least overlap at said node;
a system for injecting resin so as to assemble said two stiffeners.

According to a possible feature of the invention, the device further comprises a system for draping stiffener covering preforms in said channels and a system for unidirectional yarn winding in said preforms so as to constitute a stiffener reinforcement.

Preferably, the manufacturing of stiffener covering preforms is carried out by a pressing system or by a continuous preforming system, which are simple and cost-effective solutions.

For similar reasons, the winding is carried out using an automatic filament winding means or by the placing of dry fibers. In particular, automatic winding enables among other things time to be saved during manufacturing.

According to a possible feature of the invention, the device also comprises a system for skin preform draping.

According to a particular embodiment of the device, the punches are trapezoidal in cross-section.

This cross-section for the punches is linked to the desired shape of the stiffeners due to the fact that they form channels between them. Thus, in order for the cross-section of the channels to be V-shaped, the cross-section of the punches is beveled, and is in particular in the shape of a trapezoid, a flat surfaced punch being the simplest to use, in particular at the time of its positioning on the mandrel.

Other cross-sections for punches may therefore be envisioned according to the shape it is desired to give to the stiffeners.

According to a possible feature, the fastening of punches to the mandrel is carried out via at least two screws inserted into each punch in holes provided for that purpose, the tapped hole in which a first screw is disposed and the hole in which is disposed a second screw comprising a guide pin.

The use of an insert in the tapped hole, preferably of steel and/or of helicoil type, in punches produced for example in aluminum, enables the life of the screw threading to be improved.

Furthermore, the use of a guide pin makes it possible to lock the degree of freedom in rotation of one of the screws while enabling differential expansion between the mandrel and a punch in the different manufacturing steps.

Lastly, the invention also concerns an aircraft fuselage produced using a method according to the invention.

Other features and advantages will appear in the course of the following description, which is given by way of non-limiting example and made with reference to the accompanying drawings, in which:

FIG. 2 is a diagrammatic representation of a cross-section of part of the fuselage of FIG. 1a;

Figure 1:
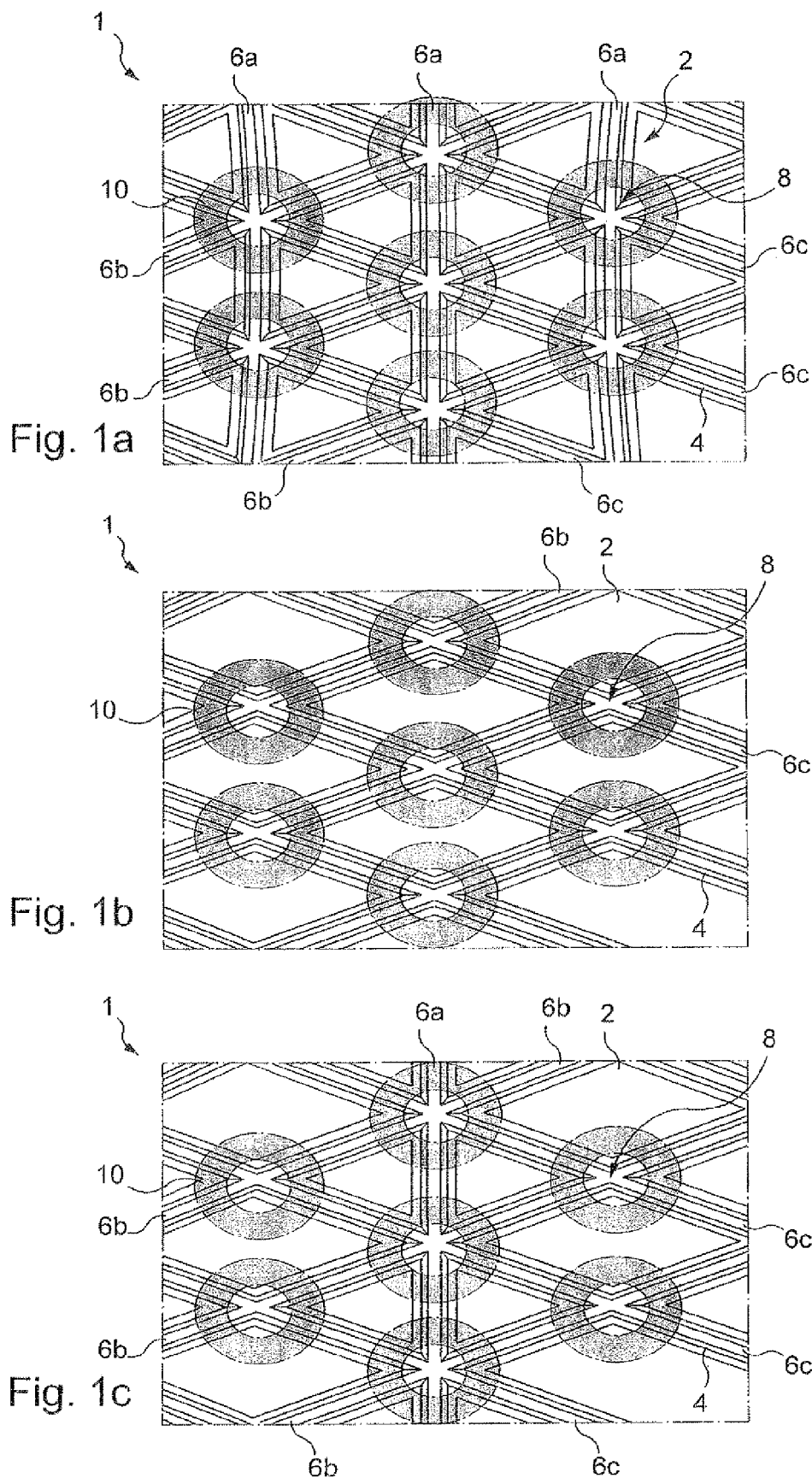
FIG. 1a is a diagrammatic representation of part of a structure, in this case of a fuselage according to the invention in a first embodiment.
FIG. 1b is a diagrammatic representation of part of a structure, in this case of a fuselage according to the invention in a second embodiment.
FIG. 1c is a diagrammatic representation of part of a structure, in this case of a fuselage according to the invention in a third embodiment.

The section of fuselage represented in FIG. 1a comprises a skin 2, to which stiffeners 4 are joined. The skin 2 is constituted by layers of reinforcing fibers.

The stiffeners 4 are composed of reinforcements having unidirectional fibers enveloped in fabrics or multiaxials as will be described later, as will also be the manner in which the skin and the stiffeners are joined.

In the embodiment presented in that FIG. 1a, the stiffeners 4 are distributed in three networks 6a, 6b and 6c, each network being composed of stiffeners extending in planes that are parallel to each other.

The networks 6a, 6b, 6c are disposed such that any point of intersection between two stiffeners of two different networks, or node 8, is also a point of intersection with one of the stiffeners of the third network. Optionally, for example to limit bulk, the points of intersection with the third network may be slightly offset relative to the point of intersection of the first networks.

However, other embodiments may be envisioned, in particular a disposition of the networks such that a point of intersection between two stiffeners of two different networks is not always a point of intersection with another stiffener of a third network. For example, the distance between the stiffeners of the same network may be chosen in order for every other stiffener of the same network to meet the stiffeners of the other two networks. Another embodiment presented in FIG. 1b only includes two networks of stiffeners 6b, 6c disposed obliquely relative to a circumferential network of frames, in order to take up the forces usually borne by the frames, the clips and the cleats.

Another possible configuration (not shown) involves one of the networks 6b, 6c being disposed circumferentially on the skin 2, in the manner of the network 6a of FIG. 1a.

It will be noted that in the embodiment presented in FIG. 1a, the networks 6a, 6b, 6c are disposed geodesically. In particular, the stiffeners 4 of the same network 6 are placed at equal distance from each other and that distance is the same for the three networks 6a, 6b 6c.

Alternatively, the distance between the stiffeners 4 of the same network is different for each network as illustrated by FIG. 1c.

In that FIG. 1c, the distance between the stiffeners of the network 6a is different from the distance between the stiffeners of the network 6b of the network 6c, and for example its value is twice that of the other distances. The stiffeners 4 of the network 6a thus meet the other stiffeners at every other node 8.

In all the embodiments, when projected onto a plane, the network thus forms polygons whose vertices are the nodes 8. In the examples illustrated in FIGS. 1a, 1b and 1c these polygons are triangles or rhomboids.

Optionally, and as represented in FIGS. 1a-c, the nodes 8 are equipped with a hat 10.

A hat 10 is constituted in particular by a reinforcing fabric of composite material, or a multiaxial, the function of which is to ensure a mechanical connection between the stiffeners 4 meeting at each node 8 and to take up part of the shear forces. For this they cover all the ends of the stiffeners 4 at the location of each node 8.

Figure 2:
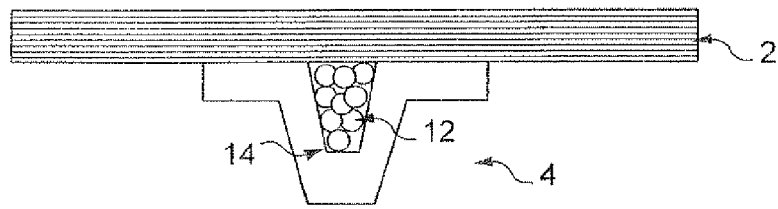

The structure of a stiffener 4 is illustrated in FIG. 2. Each stiffener comprises a reinforcement 12 constituted, preferably, by fibers or strands of unidirectional reinforcements extending in the direction of the stiffener and by a covering of fabric or multiaxiais.

In particular, these fibrous reinforcements may be produced from carbon or any other material commonly used in this kind of application in the aeronautical field, in this manner, the stiffeners benefit from good resistance to tension and in part even to bending.

The unidirectional reinforcements 12 are enveloped in a covering 14 of fabric or multiaxials. They are of triangular cross-section, but other cross-sections such as of T- or Omega-shape may be envisioned.

Preferably, the coverings 14 are composed of fabrics or multiaxials, for example in known manner via a structure in layers disposed at 0°, 90°, −45° and 45°, at 0°, 90°, −30° and 30°, at −45° and 45°, or at −30° and 30°.

The skin 2 is draped on the coverings 14 and unidirectional reinforcements 12 during a molding operation. This makes it possible to obtain a structure made as a single part, which reduces the manufacturing costs.

The following Figures illustrate the method of manufacturing a structure according to the invention. Stiffener preforms will be discussed here before the injecting step.

Figure 3:
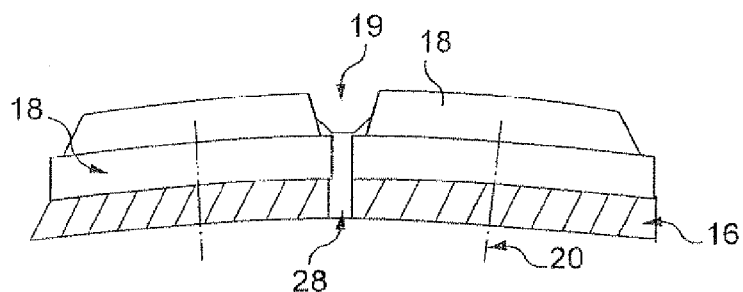
FIG. 3 is a diagrammatic representation of a cross-section of some of the components for manufacturing the fuselage of FIG. 1a prior to draping the preform of the skin.

As illustrated in FIG. 3, the first step of the manufacturing method consists of placing, on a mandrel 16, punches 18 which are preferably produced from aluminum and of trapezoidal cross-sections.

Figure 7:
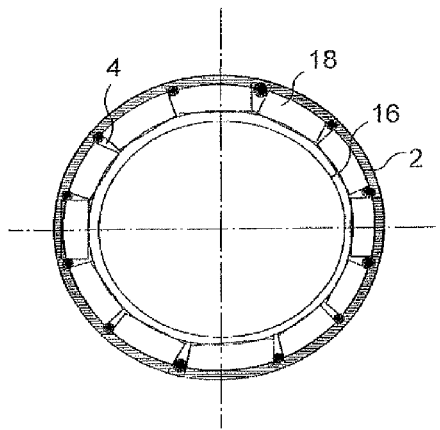
FIG. 7 is a diagrammatic representation of a molding principle for a cylindrical structure which could be a fuselage component.

In the embodiment presented in FIG. 7, the mandrel 16 is a cylinder, but it may be of curved sheet metal as illustrated in FIG. 3.

In particular, it may be thermally expandable.

Figure 4:
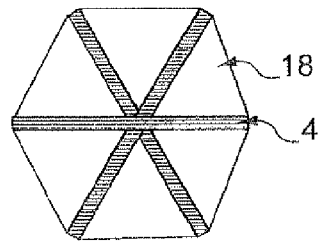
FIG. 4 is a representation of a view of the components of FIG. 3 from above.

The punches 18 are identical here and of substantially triangular shape as illustrates the view from above presented by FIG. 4.

This particular choice is linked to the fact that it is desired that the networks 6a, 6b, 6c be arranged geodesically.

In other embodiments (not shown) the shape of the punches 18 may vary, in particular be close to that of a rhomboid in the case of a structure with two networks oriented at 45°. In still other embodiments, it is possible for the punches 18 not all to have the same shape.

The cross-section of the punches 18 is linked to the shape desired for the stiffeners. More particularly, the punches 18 are arranged regularly and slightly spaced apart from each other so as to form channels 19 between them.

These channels 19 serve as an envelope for the preforms of the stiffeners 4.

Their shape and their size are chosen so as to obtain the desired cross-section for the stiffeners. Thus, in the preferred embodiment presented in FIG. 3, the cross-section of the punches 18 is beveled such that the channels have a V-shaped cross-section.

In other embodiments, in particular those in which the stiffeners are T- or Omega-shaped, the cross-section of the punches 18 is adapted accordingly.

Figure 6:
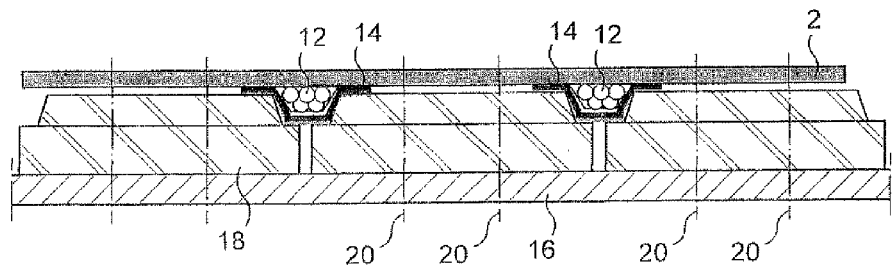
FIG. 6 is a diagrammatic representation in cross-section of some of the components for manufacturing the fuselage of FIG. 1a after draping the skin.
Figure 8:
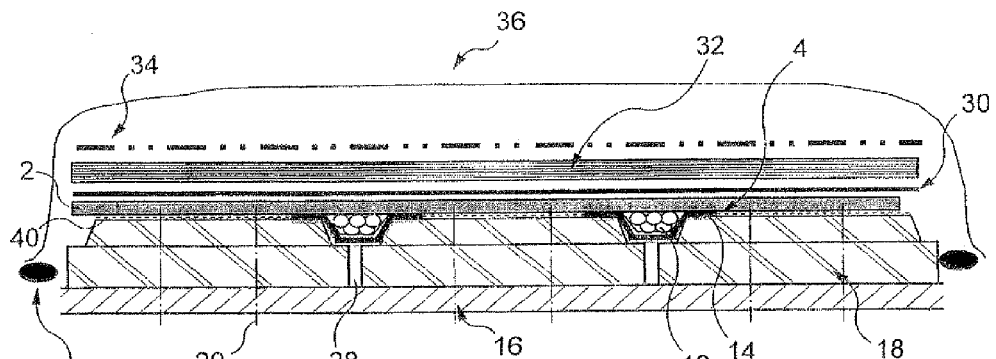
FIG. 8 is a diagrammatic representation in cross-section of the components for manufacturing the fuselage of FIG. 1a at the time of laying-up prior to polymerization of the resin.

The punches 18 are fastened to the mandrel 16 using fastening means 20 represented diagrammatically by chain line in FIGS. 3, 6 and 8 for reasons of clarity.

Figure 5:
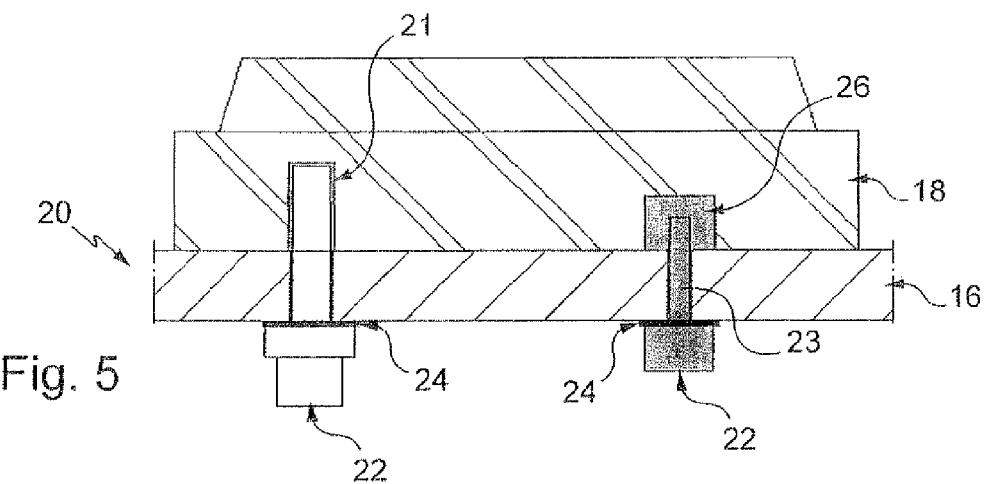
FIG. 5 is a diagrammatic representation in cross-section of a system for fastening the components of FIG. 3.

They are illustrated in more detail in FIG. 5.

In this particular embodiment, a fastening means 20 is constituted by at least two screws 22, an insert 21, a guide pin 23 and seals 24.

In alternative embodiments, a fastening means 20 may comprise a different number of each of the parts already cited, or even comprise no insert or guide pin.

For each punch, one of the two screws 22 passes through the mandrel and serves as a guide pin 23 in an oblong hole 26 made for that purpose. They are positioned so as to bear the loads applied to the punch and to allow for the differential expansions between the punch and the mandrel. To facilitate mounting, the screws are screwed from inside the mandrel 16.

An insert 21, preferably formed from steel and of "helicoil" type, is integrated between at least one of the screws 22 and the punch 18 so as to extend the life of the screw threading.

In order to lock the degree of freedom in rotation while enabling differential expansion of the screws 22 and of the punch 18 during the heating of the assembly, at least one guide pin 23 is placed in an oblong hole 26.

Seals 24 are provided to be disposed between the head of the screw 22 and the inside surface of the mandrel 16. They in particular make it possible to avoid air entering inside the mold during vacuum injection of the resin, which would lead to porosity in the composite material and consequently would affect its mechanical characteristics.

A fluid-tight seal, not shown in FIG. 5, may also be placed around the shank of the screw 22 at the interface between the mandrel 16 and the punch 18 so as to avoid the resin coming between the punch and the screw in the injecting step. This enables the withdrawal of the screws 22 during removal of the part from the mold to be facilitated.

Once the punches 18 have been fastened to the mandrel 16, an optional step (not shown) of mounting the hats 10 may be implemented.

It is to be recalled that the hats 10 are typically pieces of fabrics or multiaxials of substantially circular shape comprising a hole at their center at the location of the nodes.

This shape enables draping of the hats to be facilitated and to provide good distribution of the shear forces experienced at the location of the nodes However, alternative shapes and different materials may be envisioned for producing the hats.

Next, the coverings 14 of the stiffener preforms 4 are placed in the channels 19, for example using a pressing system or a continuous preforming system.

The unidirectional fibers composing the reinforcements 12 of the stiffener preforms 4 are next placed in the channels 19 lined with the coverings 14.

This laying-up is in particular carried out using a winding step, in which the mandrel 16 and the punches 18 take on the role of bobbin body and the unidirectional yarn fibers.

Lastly, the preform for the skin 2 of the fuselage is draped on the surface of the punches and of the stiffener preforms 4.

FIGS. 6 and 7 illustrate the state of the fuselage structure 1 once these positioning steps have been carried out.

FIG. 8 illustrates the step of injecting resin of the method of manufacturing the fuselage 1.

In this particular embodiment, the injection is carried out by a method known per se of bag molding in an autoclave.

More particularly, the skin 2 is successively covered by a pull-off fabric 30, by a caul plate 32, by a drainage fabric 34 and by a vacuum bag 36.

For example, the injection is carried out using injection points 28 placed under each of the nodes 8 and at the location of the stiffener preforms 4. An injection of resin at low pressure (commonly called RTM which stands for "resin transfer molding") is carried out at the location of the nodes 8 and stiffener preforms 4 and one of LRI type (LRI standing for "liquid resin infusion") between the stiffener preforms 4.

So as to obtain good quality impregnation of the preforms by the resin, the injection of the stiffeners and the injection of the skin are carried out separately.

To be precise, the injection of the stiffeners is a linear injection into the channels between the punches, and is carried out over practically the full length of the stiffeners. As regards the injection of the skin, this is either localized at the center of the punches under the skin, or, to have good quality impregnation of the skin, is surface injection (LRI type) over the entire surface of the punches at the punch-skin interface.

The LRI type injection is in particular performed using a diffuser web 40 represented in FIG. 8 (not shown in the other Figures for reasons of clarity). Placed seals 38 are provided to ensure a good quality vacuum in the mold.

The disposition of these seals 38 varies according to the form of the mandrel 16. If it is a cylinder, they are placed under the edges of the vacuum bags 36 and at the ends of the mandrel 16 on the mandrel 16. If the mandrel 16 is a curved sheet of metal the seals 38 are placed at the periphery of the mandrel 16.

Other molding techniques, such as autoclave molding, vacuum molding, pressure molding, press molding or using an expanding mandrel may also be envisioned.

The method described above thus makes it possible to obtain a fuselage structure made as a single part, having mechanical strength properties equivalent to those of a conventional structure comprising clips and stabilizers without necessarily having to integrate those parts therein (or to use a small number thereof), and thereby of lower manufacturing and assembly cost.

The embodiments presented above are merely possible examples of implementation of the invention, which is not limited thereto.

The invention claimed is:

1. A method for manufacturing a structure comprising a skin and stiffeners fastened to the skin, comprising:
   (a) positioning molding parts on a mandrel in order to form channels between said parts, said channels being disposed in at least two networks, a channel of a network meeting at least one channel of another network at a point referred to as a node;
   (b) thereafter, positioning preforms for stiffeners in the channels such that two stiffeners at least meet at said node;
   (c) thereafter, injecting resin so as to assemble the stiffeners; and
   (d) positioning a substantially circular piece of fabric holed at its center at the location of the node providing a mechanical connection between the stiffeners meeting at each node.

2. A manufacturing method according to claim 1, characterized in that the surface delimited by the longitudinal extent of a channel of at least one network is not normal to the axis of the mandrel.

3. A manufacturing method according to claim 1, further comprising positioning stiffener coverings in the channels and a step of positioning reinforcements for stiffeners on said coverings.

4. A manufacturing method according to claim 1, further comprising skin preform draping on the stiffener preforms.

5. A manufacturing method according to claim 1, characterized in that the stiffeners have a V-shaped cross-section.

6. A manufacturing method according to claim 1, characterized in that the reinforcements for the stiffeners are constituted by unidirectional yarns or rovings, and in that a covering for the stiffeners is composed of fabrics or multiaxials.

7. A manufacturing method according to claim 1, characterized in that the resin is injected into the stiffener preforms between the molding parts, and between the skin preform and the molding parts.

8. A manufacturing method according to claim 1, characterized in that the injection is carried out by a bag molding method in an autoclave using a diffuser mesh.

\* \* \* \* \*